United States Patent
Martin et al.

(10) Patent No.: US 8,275,882 B2
(45) Date of Patent: Sep. 25, 2012

(54) SYSTEM AND METHOD FOR GOAL DRIVEN THRESHOLD SETTING IN DISTRIBUTED SYSTEM MANAGEMENT

(75) Inventors: Daniel Joseph Martin, Pawling, NY (US); Ravirajan Rajan, Alex, NC (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 12/535,250

(22) Filed: Aug. 4, 2009

(65) Prior Publication Data

US 2011/0035485 A1   Feb. 10, 2011

(51) Int. Cl.
G06F 11/30 (2006.01)

(52) U.S. Cl. .................... 709/224; 709/223

(58) Field of Classification Search ............ 709/223, 709/224
See application file for complete search history.

(56) References Cited

U.S. PATENT DOCUMENTS

| | | | |
|---|---|---|---|
| 5,893,922 A | 4/1999 | Baylor et al. | |
| 6,519,592 B1 | 2/2003 | Getchius et al. | |
| 7,076,695 B2 * | 7/2006 | McGee et al. | 714/47.2 |
| 7,281,041 B2 * | 10/2007 | Daggett | 709/224 |
| 7,444,263 B2 * | 10/2008 | White et al. | 702/180 |
| 7,551,072 B2 * | 6/2009 | Tambascio et al. | 340/506 |
| 8,015,454 B1 * | 9/2011 | Harrison et al. | 714/47.3 |
| 8,015,456 B2 * | 9/2011 | Stabile et al. | 714/57 |
| 2004/0176996 A1 | 9/2004 | Powers et al. | |
| 2005/0283487 A1 | 12/2005 | Karlsson et al. | |
| 2008/0052141 A1 * | 2/2008 | Olsson et al. | 705/7 |
| 2008/0126881 A1 | 5/2008 | Bruckhaus | |

FOREIGN PATENT DOCUMENTS

| | | |
|---|---|---|
| JP | 2007241564 A | 9/2007 |
| WO | WO2006121448 A1 | 11/2006 |

* cited by examiner

*Primary Examiner* — Yasin Barqadle
*Assistant Examiner* — Van Kim T Nguyen
(74) *Attorney, Agent, or Firm* — Hamilton & Terrile, LLP; Stephen A. Terrile

(57) ABSTRACT

The present invention includes, but is not limited to, a method, system and computer-usable medium for providing automated management of threshold crossing alarms. Transaction processing resources are selected for monitoring, followed by selecting a monitoring time interval, an initial threshold alarm level. Selections are then made regarding transaction codes to monitor, acceptable average transaction processing times, and acceptable ratio of successful transactions to unsuccessful transactions. The transaction processing resources are then monitored to count the number of transactions processed, measure the processing time for individual transactions, and capture their corresponding transaction result code. An average transaction processing time value and a successful transaction ratio processing value are generated. Comparison operations are performed. If the results of the comparison operations are acceptable, then threshold crossing alarms are then suppressed and the threshold alarm level is increased. If not, then a threshold crossing alarm is generated and the threshold alarm level is decreased.

11 Claims, 4 Drawing Sheets

SYSTEM AND METHOD FOR GOAL DRIVEN THRESHOLD SETTING IN DISTRIBUTED SYSTEM MANAGEMENT

BACKGROUND OF THE INVENTION

1. Field of the Invention

Embodiments of the disclosure relate in general to the field of computers and similar technologies, and in particular to software utilized in this field. Still more particularly, it relates to the automated management of threshold crossing alarms.

2. Description of the Related Art

Threshold alarms are commonly used in resource management systems to ensure that resources are operating at their optimum capacity. Setting threshold crossing alarms is simple. Setting them correctly and effectively often proves to be much more difficult. If they are set too low, alarms are created even though there is no problem. If they are set too high, there may be a problem long before the threshold is reached. Thresholds may also be dependent upon individual system components, and in certain cases, even the current release of operating system and application software running on the system. Another issue is architectural design. As an example, some computers only use memory as they need it. Others seize all available memory and then allocates it to processes as each process requests.

In addition, threshold alarms are useful for capacity planning. For instance, if utilization on a particular Wide Area Network (WAN) interface consistently exceeds 75%, then it might be a good time to increase the bandwidth or decrease the amount of traffic crossing the interface. More commonly, threshold alarms are used for fault management and fault isolation. For instance, if the CPU utilization of a router consistently exceeds 90%, yet there is no recognized processing pattern, there is most likely a problem with the router.

Furthermore, modern day distributed application platforms are often distributed in clusters for redundancy or performance. Today, it is not unusual for a single application instance to span tens of servers. As a result, accurately setting thresholds simultaneously becomes more complex, yet more necessary.

In view of the foregoing it will be apparent that thresholds can play a key role in quickly isolating system faults when they are properly set. When not, a flood of events and alarms may be generated, masking the underlying system issues or processing faults. There are various statistical approaches to dealing with the threshold setting issues, but such approaches are static and fail to dynamically adjust to changes in available resources and transaction processing volumes. More commonly, the setting of threshold levels is performed manually, which is tedious, time consuming, and error-prone.

BRIEF SUMMARY OF THE INVENTION

The present invention includes, but is not limited to, a method, system and computer-usable medium for providing automated management of threshold crossing alarms. In various embodiments, transaction processing resources are selected for monitoring. A time interval is selected to monitor the previously selected transaction processing resources, followed by the selection of an initial threshold alarm level. An increment is selected to increase or decrease the previously selected initial threshold alarm level. Selections are then made regarding transaction codes to monitor, acceptable average transaction processing times, and acceptable ratio of successful transactions to unsuccessful transactions. In various embodiments, the selections are made in response to receiving user input data related to the respective selections. In various other embodiments, the selections are made automatically in response to receiving resource management system data related to the respective selections.

The transaction processing resources are then monitored to count the number of transactions processed, measure the processing time for individual transactions, and capture their corresponding transaction result code. The number of transactions processed during the monitoring time interval is processed with the individual processing times of the processed transactions to generate an average transaction processing time value. Then, the number of transactions processed during the monitoring time interval is processed with the respective transaction result codes associated with the processed transactions to generate a successful transaction ratio processing value.

The average transaction processing time value is then compared to the acceptable average transaction processing time. If the average transaction processing time value is acceptable, then the successful transaction processing ratio value is compared to the acceptable ratio of successful transactions. If the successful transaction processing ratio value is acceptable, then threshold crossing alarms generated as a result of transaction processing faults are designated as child events of the corresponding transaction processing faults. The threshold crossing alarms are then suppressed, followed by increasing the threshold alarm level by the previously selected increment. However, if it is determined that the average transaction processing time value is not acceptable or the successful transaction processing ratio value is not acceptable, then a threshold crossing alarm is generated, followed by decreasing the threshold alarm level by the previously selected increment selected. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
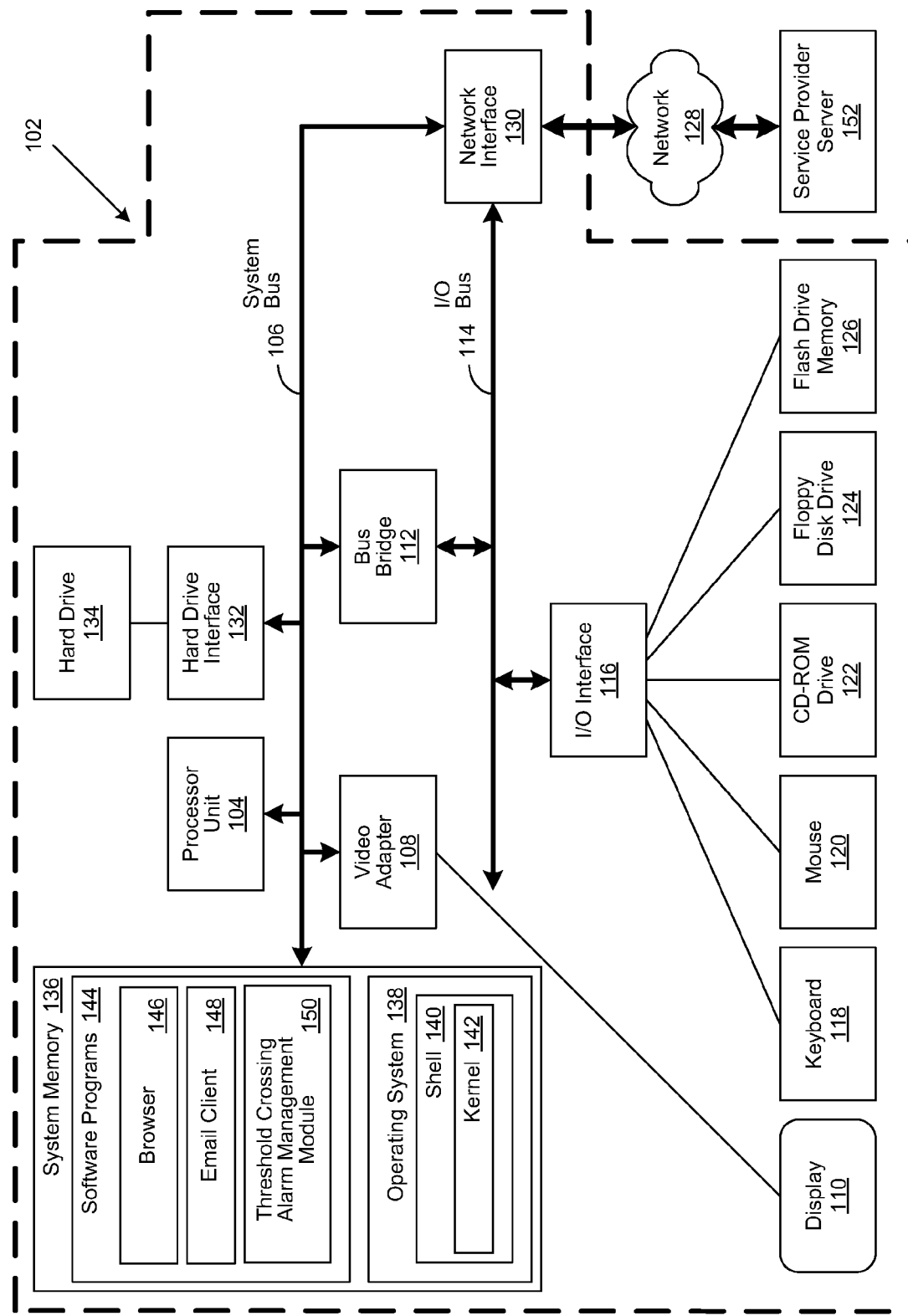
FIG. 1 depicts an exemplary client computer in which the present invention may be implemented.

A method, system and computer-usable medium are disclosed for providing automated management of threshold crossing alarms. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a threshold crossing alarm management module 150. The threshold crossing alarm management module 150 includes code for implementing the processes described in FIGS. 2 through 3 described hereinbelow. In one embodiment, client computer 102 is able to download threshold crossing alarm management module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
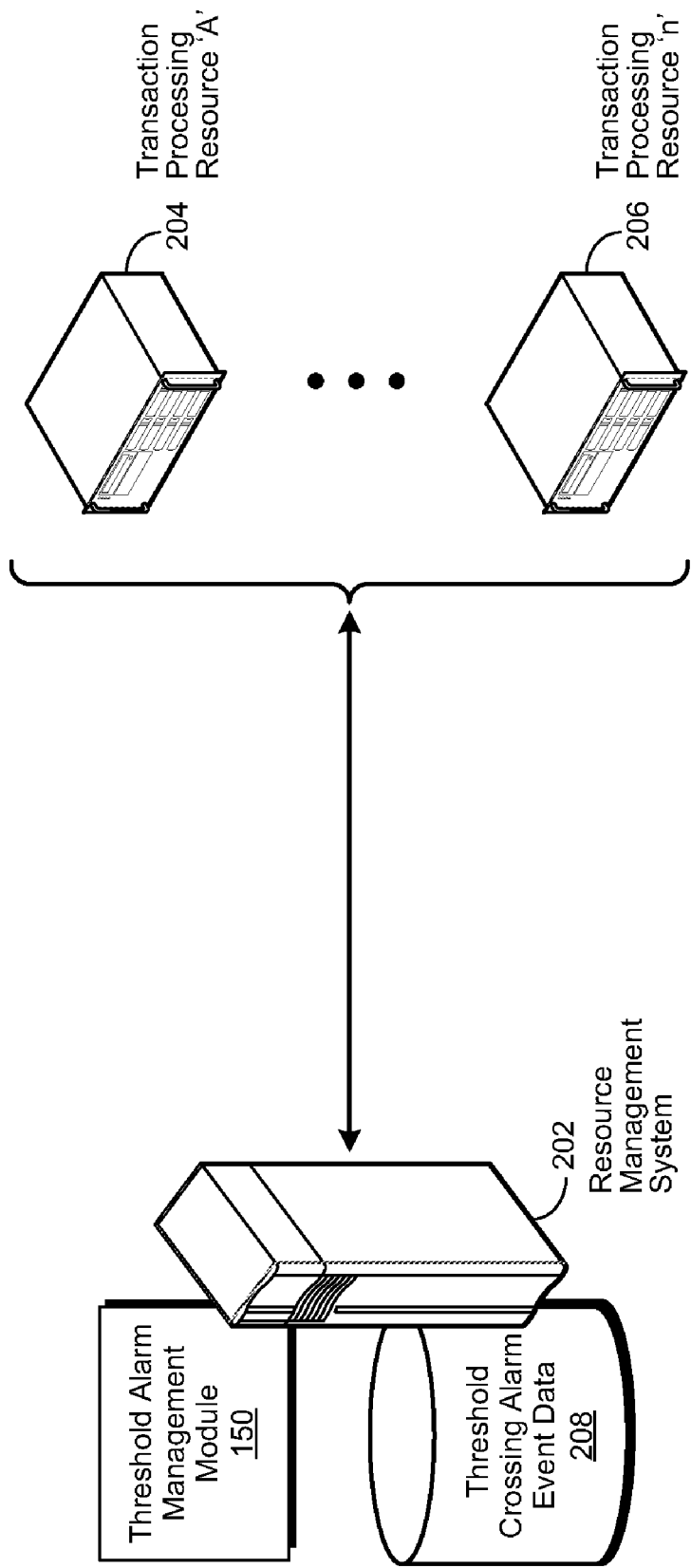
FIG. 2 shows a simplified block diagram of a threshold crossing alarm management module as implemented with a resource management system for the automated management of threshold crossing alarms.

FIG. 2 shows a simplified block diagram of a threshold crossing alarm management module as implemented with a resource management system in accordance with an embodiment of the invention for the automated management of threshold crossing alarms. In various embodiments, a threshold alarm management module 150 is implemented with a resource management system 202 to automate the management of threshold crossing alarms. In these and other embodiments, the resource management system 202 comprises a repository of threshold crossing alarm data and manages a plurality of transaction processing resources 'A' 204 through 'n' 206. In various embodiments, the transaction processing resources 'A' 204 through 'n' 206, comprise a variety of computing and communication hardware, software and middleware applications, along with networking and communication technologies. It will be apparent to skilled practitioners of the art that many such combinations are possible to provide the processing of transactions and the foregoing is not intended to limit the spirit, scope, or intent of the invention.

In this embodiment, transaction processing resources 'A' 204 through 'n' 206 are selected for monitoring. A time interval is selected to monitor the previously selected transaction processing resources, followed by the selection of an initial threshold alarm level. An increment is selected to increase or decrease the previously selected initial threshold alarm level. Selections are then made regarding transaction codes to monitor, acceptable average transaction processing times, and acceptable ratio of successful transactions to unsuccessful transactions. In various embodiments, the selections are made in response to receiving user input data related to the respective selections. In various other embodiments, the selections are made automatically in response to receiving resource management system data related to the respective selections.

The transaction processing resources 'A' 204 through 'n' 206 are then monitored to count the number of transactions processed, measure the processing time for individual transactions, and capture their corresponding transaction result code. The number of transactions processed during the monitoring time interval is processed with the individual processing times of the processed transactions to generate an average transaction processing time value. Then, the number of transactions processed during the monitoring time interval is processed with the respective transaction result codes associated with the processed transactions to generate a successful transaction ratio processing value.

The average transaction processing time value is then compared to the acceptable average transaction processing time. If the average transaction processing time value is acceptable, then the successful transaction processing ratio value is compared to the acceptable ratio of successful transactions. If the successful transaction processing ratio value is acceptable, then threshold crossing alarms generated as a result of transaction processing faults are designated as child events of the corresponding transaction processing faults. The threshold crossing alarms are then suppressed, followed by increasing the threshold alarm level by the previously selected increment. However, if it is determined that the average transaction processing time value is not acceptable or the successful transaction processing ratio value is not acceptable, then a threshold crossing alarm is generated, followed by decreasing the threshold alarm level by the previously selected increment selected.

Figure 3A:
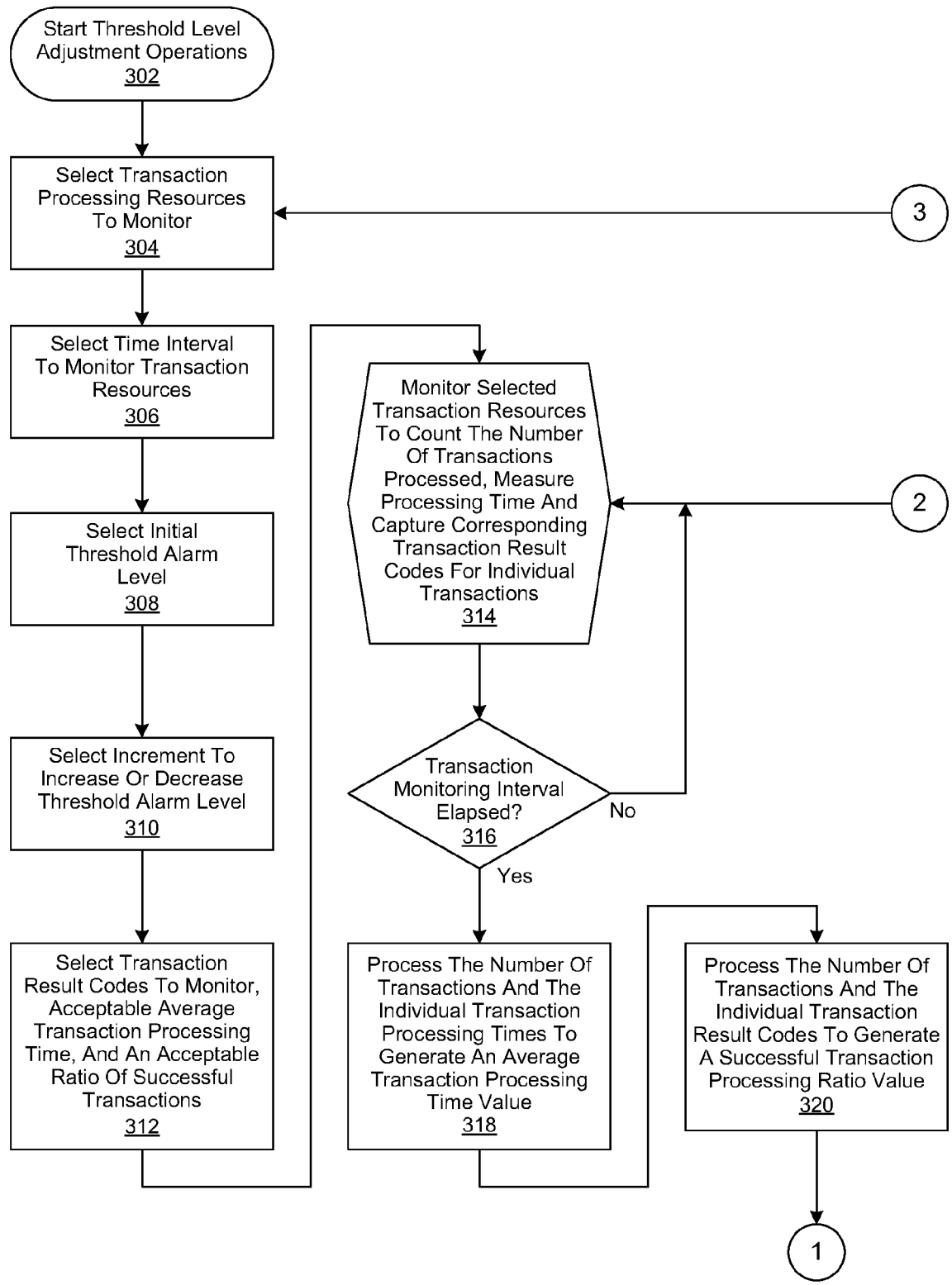
FIGS. 3*a-b* are a generalized flow chart of the operation of a threshold crossing alarm management module as implemented with a network management for the automated management of threshold crossing alarms.
Figure 3B:
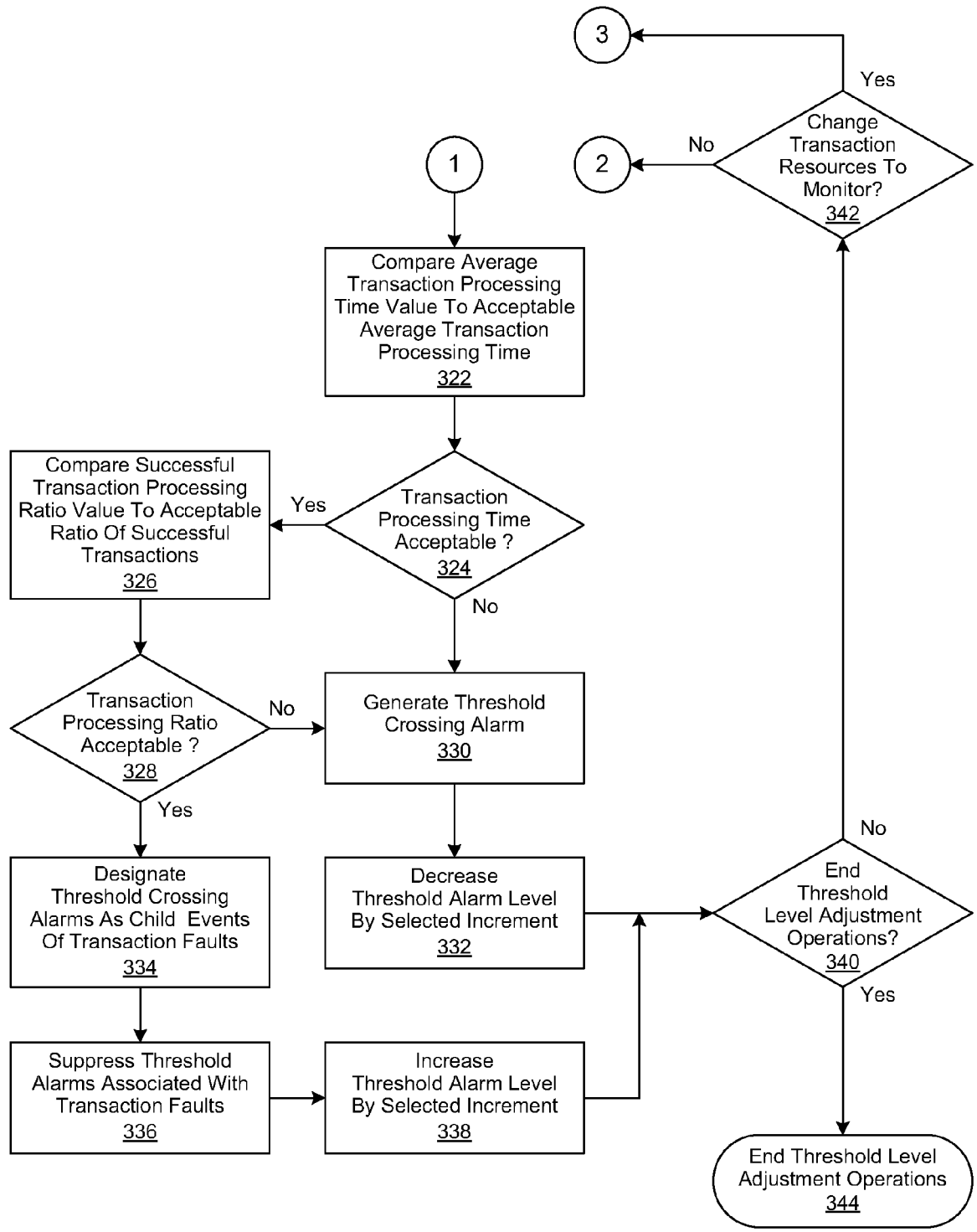

FIGS. 3a-b are a generalized flow chart of the operation of a threshold crossing alarm management module as implemented with a resource management system in accordance with an embodiment of the invention for the automated management of threshold crossing alarms. In this embodiment, threshold crossing alarm level adjustment operations are begun in step 302, followed by the selection in step 304 of transaction processing resources to monitor. In step 306, a time interval is selected to monitor the previously selected transaction processing resources, followed in step 308 with the selection of an initial threshold alarm level. In step 310, an increment is selected to increase or decrease the previously selected initial threshold alarm level. In step 312, selections are made regarding transaction codes to monitor, acceptable average transaction processing times, and acceptable ratio of successful transactions to unsuccessful transactions. In various embodiments, the selections made in steps 304, 306, 308, 310, and 312 are made in response to receiving user input data related to the respective selections. In various other embodiments, the selections made in steps 304, 306, 308, 310, and 312 are made automatically in response to receiving resource management system data related to the respective selections.

In step 314 the selected transaction processing resources are monitored to count the number of transactions processed, measure the processing time for individual transactions, and capture their corresponding transaction result code. A determination is then made in step 316 whether the previously selected transaction monitoring time interval has elapsed. If not, the process is continued, proceeding to step 314. Otherwise, the number of transactions processed during the monitoring time interval is processed with the individual processing times of the processed transactions in step 318 to generate an average transaction processing time value. Then, in step 320, the number of transactions processed during the monitoring time interval is processed with the respective transaction result codes associated with the processed transactions to generate a successful transaction ratio processing value.

In step 322, the average transaction processing time value generated in step 318 is then compared to the acceptable average transaction processing time selected in step 312. A determination is then made in step 322 whether the average transaction processing time value is acceptable. If so, then in step 326, the successful transaction processing ratio value generated in step 320 is compared to the acceptable ratio of successful transactions selected in step 312. A determination is then made in step 328 whether the successful transaction processing ratio value is acceptable. If not, or if it is determined in step 324 that the average transaction processing time value is not acceptable, then a threshold crossing alarm is generated in step 330, followed by step 332, where the threshold alarm level selected in step 308 is decreased by the increment selected in step 310.

However, if it is determined in step 328 that the successful transaction processing ratio value is not acceptable, then threshold crossing alarms generated as a result of transaction processing faults are designated in step 334 as child events of the corresponding transaction processing faults. The threshold crossing alarms are then suppressed in step 338, followed by step 338, where the threshold alarm level selected in step 308 is increased by the increment selected in step 310. Once the threshold alarm level is decreased in step 332 or increased in step 338, a determination is made in step 340 whether to end threshold crossing alarm level adjustment operations. If not, then a determination is made in step 342 whether to change the selection of transaction resources to monitor. If so, the process is continued, proceeding with step 304. Otherwise, the process is continued, proceeding with step 314. However, if it is determined in step 340 to end threshold crossing alarm level adjustment operations, then they are ended in step 344.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for automating management of threshold crossing alarms generated by a plurality of transaction processing resources, comprising:
   receiving user input data comprising:
      threshold setting data comprising an alarm threshold value; and
      threshold adjustment data comprising an threshold adjustment value;
   generating a threshold crossing alarm and decreasing the alarm threshold value by the threshold adjustment value in response to receiving a first transaction processing value that is greater than the alarm threshold value; and
   suppressing the threshold crossing alarm and increasing the alarm threshold value by the threshold adjustment value in response to receiving a second transaction processing value that is less than the alarm threshold value;
   counting a number of transactions processed by the plurality of the transaction processing resources;
   measuring a time to process an individual transaction from one of the plurality of transaction processing resources;
   capturing a transaction result code associated with the individual transaction;
   processing the number of transactions and the individual transaction processing times to generate an average transaction processing time value;
   processing the number of transactions and the individual transaction result codes to generate a successful transaction processing ratio value;
   processing the average transaction processing time value and the successful transaction processing ratio value to generate the first transaction processing value and the second transaction processing value so as to automate management of threshold crossing alarms generated by the plurality of transaction processing resources;
   wherein the first transaction processing value is generated when:
      the average transaction processing time value is greater than a predetermined target transaction processing time value; and
      the successful transaction processing ratio value is less than a target transaction processing ratio value; and
   wherein the second transaction processing value is generated when:
      the average transaction processing time value is less than a predetermined target transaction processing time value; and
      the successful transaction processing ratio value is greater than a target transaction processing ratio value.

2. The method of claim 1, wherein the target transaction processing time value and the target transaction processing ration value are selected by receiving user input data comprising target transaction processing time data and target transaction processing ration data.

3. The method of claim 1, wherein the target transaction processing time value and the target transaction processing ratio value are selected by receiving user input data comprising target transaction processing time data and target transaction processing ratio data.

4. A system comprising:
   a processor;
   a data bus coupled to the processor; and
   a computer-usable medium embodying computer program code, the computer-usable medium being coupled to the data bus, the computer program code automating management of threshold crossing alarms generated by a plurality of transaction processing resources and comprising instructions executable by the processor and configured for:
   receiving user input data comprising:
      threshold setting data comprising an alarm threshold value; and
      threshold adjustment data comprising an threshold adjustment value;
   generating a threshold crossing alarm and decreasing the alarm threshold value by the threshold adjustment value in response to receiving a first transaction processing value that is greater than the alarm threshold value; and
   suppressing the threshold crossing alarm and increasing the alarm threshold value by the threshold adjustment value in response to receiving a second transaction processing value that is less than the alarm threshold value;

count a number of transactions processed by the plurality of the transaction processing resources;
measure a time to process an individual transaction from one of the plurality of transaction processing resources;
capture a transaction result code associated with the individual transaction;
process the number of transactions and the individual transaction processing times to generate an average transaction processing time value;
process the number of transactions and the individual transaction result codes to generate a successful transaction processing ratio value;
process the average transaction processing time value and the successful transaction processing ratio value to generate the first transaction processing value and the second transaction processing value so as to automate management of threshold crossing alarms generated by the plurality of transaction processing resources;
wherein the first transaction processing value is generated when:
  the average transaction processing time value is greater than a predetermined target transaction processing time value; and
  the successful transaction processing ratio value is less than a target transaction processing ratio value; and
wherein the second transaction processing value is generated when:
  the average transaction processing time value is less than a predetermined target transaction processing time value; and
  the successful transaction processing ratio value is greater than a target transaction processing ratio value.

5. The system of claim 4, wherein the target transaction processing time value and the target transaction processing ratio value are selected by receiving user input data comprising target transaction processing time data and target transaction processing ration data.

6. The system of claim 4, wherein the target transaction processing time value and the target transaction processing ratio value are selected by receiving user input data comprising target transaction processing time data and target transaction processing ratio data.

7. A non-transitory computer-usable medium embodying computer program code, the computer program code comprising computer executable instructions configured for:
receiving user input data comprising:
  threshold setting data comprising an alarm threshold value; and
  threshold adjustment data comprising an threshold adjustment value;
generating a threshold crossing alarm and decreasing the alarm threshold value by the threshold adjustment value in response to receiving a first transaction processing value that is greater than the alarm threshold value; and
suppressing the threshold crossing alarm and increasing the alarm threshold value by the threshold adjustment value in response to receiving a second transaction processing value that is less than the alarm threshold value;
counting a number of transactions processed by the plurality of the transaction processing resources;
measuring a time to process an individual transaction from one of the plurality of transaction processing resources;
capturing a transaction result code associated with the individual transaction;
processing the number of transactions and the individual transaction processing times to generate an average transaction processing time value;
processing the number of transactions and the individual transaction result codes to generate a successful transaction processing ratio value;
processing the average transaction processing time value and the successful transaction processing ratio value to generate the first transaction processing value and the second transaction processing value so as to automate management of threshold crossing alarms generated by the plurality of transaction processing resources;
wherein the first transaction processing value is generated when:
  the average transaction processing time value is greater than a predetermined target transaction processing time value; and
  the successful transaction processing ratio value is less than a target transaction processing ratio value; and
wherein the second transaction processing value is generated when:
  the average transaction processing time value is less than a predetermined target transaction processing time value; and
  the successful transaction processing ratio value is greater than a target transaction processing ratio value.

8. The computer usable medium of claim 7, wherein the target transaction processing time value and the target transaction processing ratio value are selected by receiving user input data comprising target transaction processing time and target transaction processing time data and target transaction processing data.

9. The computer usable medium of claim 7, wherein the target transaction processing time value and the target transaction processing ratio value are selected by receiving user input data comprising target transaction processing time data and target transaction processing ratio data.

10. The computer usable medium of claim 7, wherein the computer executable instructions are deployable to a client computer from a server at a remote location.

11. The computer usable medium of claim 7, wherein the computer executable instructions are provided by a service provider to a customer on an on-demand basis.

* * * * *